(12) United States Patent
Bronstein et al.

(10) Patent No.: US 8,171,303 B2
(45) Date of Patent: May 1, 2012

(54) AUTHENTICATING A LOGIN

(75) Inventors: Alexandre Bronstein, Palo Alto, CA (US); Alon Waksman, Palo Alto, CA (US)

(73) Assignee: Astav, Inc., Pacifica, CA (US)

( * ) Notice: Subject to any disclaimer, the term of this patent is extended or adjusted under 35 U.S.C. 154(b) by 1231 days.

(21) Appl. No.: 10/980,910

(22) Filed: Nov. 3, 2004

(65) Prior Publication Data

US 2006/0095788 A1    May 4, 2006

(51) Int. Cl.
*H04L 9/00* (2006.01)

(52) U.S. Cl. ........ 713/185; 713/168; 713/182; 709/225; 455/411; 726/2; 726/5; 726/6

(58) Field of Classification Search .................. 713/166, 713/168, 182, 185, 155, 186; 726/1, 2, 5, 726/6; 709/225; 455/411
See application file for complete search history.

(56) References Cited

U.S. PATENT DOCUMENTS

| | | | |
|---|---|---|---|
| 5,311,594 A | 5/1994 | Penzias | |
| 5,774,869 A * | 6/1998 | Toader | 705/10 |
| 5,907,597 A * | 5/1999 | Mark | 379/93.03 |
| 5,991,617 A * | 11/1999 | Powell | 455/410 |
| 6,404,862 B1 * | 6/2002 | Holt | 379/93.02 |
| 6,671,672 B1 * | 12/2003 | Heck | 704/273 |
| 6,782,080 B2 * | 8/2004 | Leivo et al. | 379/93.04 |
| 6,871,063 B1 * | 3/2005 | Schiffer | 455/410 |
| 6,943,682 B1 | 9/2005 | Dowens | |
| 7,058,817 B1 * | 6/2006 | Ellmore | 713/183 |
| 7,100,054 B2 * | 8/2006 | Wenisch et al. | 713/185 |
| 7,149,899 B2 * | 12/2006 | Pinkas et al. | 713/182 |
| 7,194,437 B1 | 3/2007 | Britto et al. | |
| 7,216,361 B1 * | 5/2007 | Roskind et al. | 726/9 |
| 7,225,464 B2 * | 5/2007 | Satyavolu et al. | 726/10 |
| 7,237,118 B2 * | 6/2007 | Himberger et al. | 713/182 |
| 7,292,680 B1 * | 11/2007 | Simpson | 379/88.18 |
| 7,308,579 B2 | 12/2007 | Abela | |
| 7,318,234 B1 * | 1/2008 | Dharmarajan | 726/2 |
| 7,360,694 B2 * | 4/2008 | Wankmueller | 235/382 |
| 7,373,515 B2 * | 5/2008 | Owen et al. | 713/182 |
| 7,430,758 B2 * | 9/2008 | Toutonghi | 726/5 |
| 7,467,411 B2 * | 12/2008 | Bronstein | 726/26 |
| 2001/0037469 A1 * | 11/2001 | Gupta et al. | 713/202 |
| 2002/0004831 A1 * | 1/2002 | Woodhill | 709/229 |
| 2002/0099648 A1 | 7/2002 | DeVoe et al. | |
| 2003/0105960 A1 * | 6/2003 | Takatori et al. | 713/168 |
| 2003/0112942 A1 | 6/2003 | Brown et al. | |
| 2003/0128822 A1 * | 7/2003 | Leivo et al. | 379/93.02 |
| 2003/0144952 A1 | 7/2003 | Brown et al. | |
| 2003/0182214 A1 | 9/2003 | Taylor | |
| 2003/0204610 A1 | 10/2003 | Howard et al. | |
| 2003/0221125 A1 * | 11/2003 | Rolfe | 713/201 |
| 2004/0123162 A1 * | 6/2004 | Antell et al. | 713/202 |
| 2004/0168067 A1 | 8/2004 | Russikoff | |
| 2004/0168083 A1 | 8/2004 | Gaparini et al. | |
| 2004/0187018 A1 * | 9/2004 | Owen et al. | 713/200 |
| 2004/0243514 A1 * | 12/2004 | Wankmueller | 705/40 |
| 2005/0015257 A1 * | 1/2005 | Bronstein | 704/277 |
| 2005/0021982 A1 * | 1/2005 | Popp et al. | 713/184 |
| 2005/0108551 A1 * | 5/2005 | Toomey | 713/185 |
| 2005/0228782 A1 * | 10/2005 | Bronstein et al. | 707/3 |

(Continued)

*Primary Examiner* — Nasser Goodarzi
*Assistant Examiner* — Shanto M Abedin (57) ABSTRACT

Techniques for authenticating a login that avoid the imposition of memorization burdens on users of a computer system. The present techniques include determining whether an appropriate token is stored on a client system that originates the login, authenticating a login by communicating with a user via a secondary communication channel, and authenticating a login by engaging in a private question/private answer dialogue with a user.

13 Claims, 5 Drawing Sheets

U.S. PATENT DOCUMENTS

| | | |
|---|---|---|
| 2005/0268107 A1 | 12/2005 | Harris |
| 2005/0273626 A1* | 12/2005 | Pearson et al. ............... 713/186 |
| 2006/0015742 A1* | 1/2006 | Camaisa et al. ............. 713/182 |
| 2006/0036868 A1* | 2/2006 | Cicchitto ..................... 713/182 |
| 2006/0095779 A9 | 5/2006 | Bhat et al. |
| 2006/0101508 A1 | 5/2006 | Taylor |
| 2006/0131385 A1 | 6/2006 | Kim |
| 2006/0149970 A1* | 7/2006 | Imazu .......................... 713/183 |
| 2006/0271457 A1 | 11/2006 | Romain et al. |

* cited by examiner

AUTHENTICATING A LOGIN

BACKGROUND

Computer systems may store a variety of valuable information. For example, a computer system used for financial services may store a variety of confidential data pertaining to a financial institution as well as confidential data pertaining to clients of the financial institution. Similarly, a computer system used to provide an on-line retail service may store a variety of confidential data pertaining to customers of the on-line retail service, e.g. names, addresses, credit card numbers, etc.

A computer system may employ a login process that enables authentic users of the computer system to gain access to the computer system while preventing unauthorized parties from gaining access to the computer system. For example, a computer system used in an on-line banking service may employ a login process that enables account holders to access their accounts on-line.

A computer system may authenticate a login by prompting a user for a username and a password and then determining whether the password is the correct password for that username. Authenticating logins using passwords may require that users memorize relatively complex passwords and/or change passwords relatively frequently in order to prevent an unscrupulous party from wrongfully gaining access to accounts by guessing or stealing passwords. Unfortunately, the burdens of memorizing complex passwords and/or memorizing new passwords relatively frequently may increase user frustration and dissuade users from employing computer-based services.

SUMMARY OF THE INVENTION

Techniques are disclosed for authenticating a login that avoid the imposition of memorization burdens on users of a computer system. The present techniques include authenticating a login by determining whether an appropriate token is stored on a client system that originates the login, authenticating a login by communicating with a user via a secondary communication channel, and authenticating a login by engaging in a private question/private answer dialogue with a user.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1A:
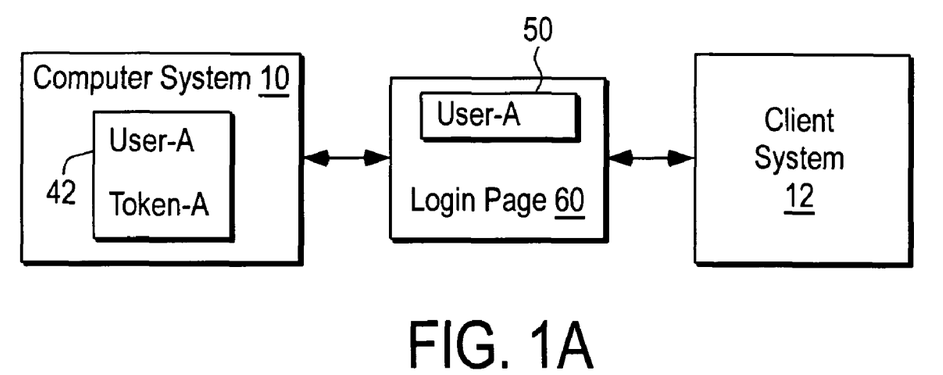
FIGS. 1a-1b illustrate a method for by authenticating a login by determining whether an appropriate token is stored on a client system that originates the login.
Figure 1B:
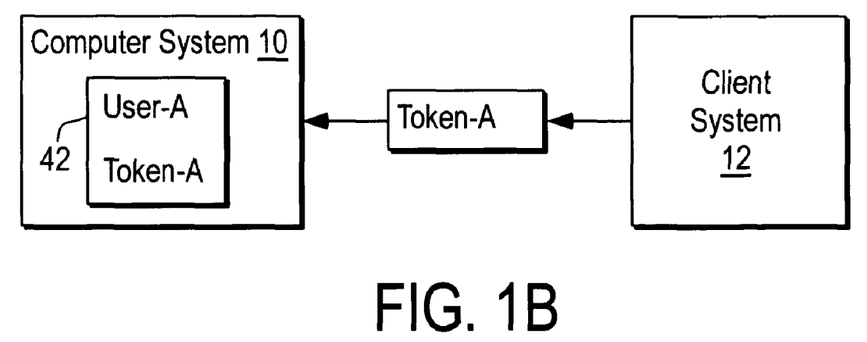

FIGS. 1a-1b illustrate a method for authenticating a login to a computer system 10 by determining whether an appropriate token is stored on a client system 12 that originates the login. The computer system 10 generates a login page 60 that enables a user of the client system 12 to enter a username in a login username field 50. The computer system 10 obtains the username via the login page 60 and uses the username to locate an entry in a data store 40 that corresponds to the username entered in the login page 60. In the example shown, the user entered USER-A into the login username field 50 and the computer system 10 matches to the entry 42 that also holds the username USER-A.

In one embodiment, the computer system 10 authenticates the login by verifying whether a token TOKEN-A specified in the entry 42 is stored on the client system 12. The computer system 10 may verify the token by obtaining it in a cookie from the client system 12. Alternatively, the computer system 10 may read the token from a file on the client system 12. The computer system 10 decrypts the token obtained from the client system 12 if appropriate. The login is authentic only if the token TOKEN-A from the entry 42 is stored on the client system 12.

In another embodiment, the computer system 10 authenticates the login by comparing a password entered by a user into the login page 60 to a password contained in the entry 42 and verifying whether a token TOKEN-A from the entry 42 is stored on the client system 12. The login is authentic only if the password entered into the login page 60 matches the password contained in the entry 42 and the token TOKEN-A from the entry 42 is stored on the client system 12.

Figure 2A:
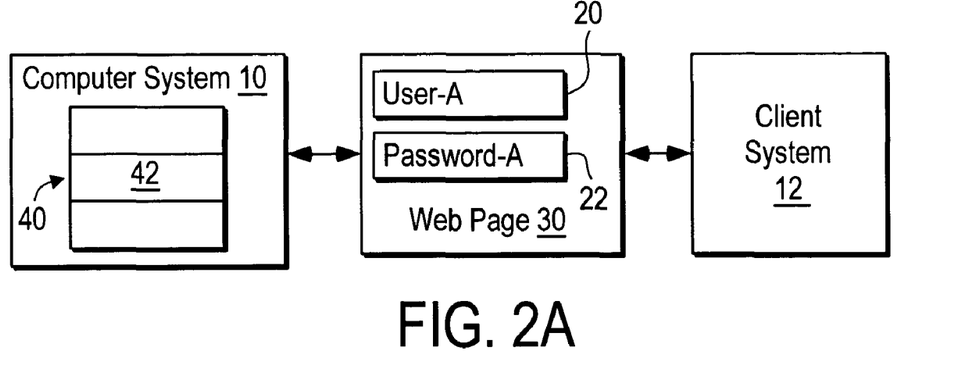
FIGS. 2a-2b illustrate generating an appropriate token during creation of a user account on a computer system.
Figure 2B:
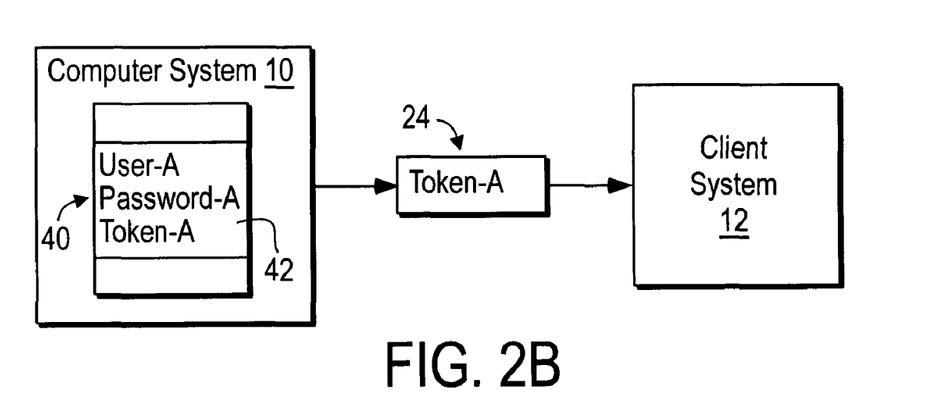

FIGS. 2a-2b illustrate generating an appropriate token during creation of a user account on the computer system 10. The computer system 10 generates a web page 30 that enables a user of the client system 12 to register by entering the username USER-A in a username field 20 and an optional password PASSWORD-A in a password field 22 for the new user account. The computer system 10 obtains the username USER-A and the password PASSWORD-A via the web page 30 and stores the username USER-A and the password PASSWORD-A in the entry 42 in the data store 40 that is allocated to the new user account.

The computer system 10 generates the token TOKEN-A in response to the username and the optional password entered into the web page 30. The token TOKEN-A may be generated in a manner that prevents theft. For example, the TOKEN-A may be an encrypted version of the username USER-A with a key that is private to the computer system 10. The computer system 10 transfers the token TOKEN-A to the client system 12 in a message 24 and the client system 12 stores the token TOKEN-A internally in a manner that enables the computer system 10 to read the token TOKEN-A from the client system 12. The token TOKEN-A may be stored in a cookie on the client system 12. Alternatively, the token TOKEN-A may be stored in a file on the client system 12. The computer system 10 also stores the token TOKEN-A in the data store 40 in the entry 42 of the new user account for use in authenticating subsequent logins.

In one embodiment, the computer system 10 communicates with the client system 12 via a network using web protocols. The client system 12 may be embodied as a desktop computer, a laptop computer, a PDA or other handheld device, etc. The client system 12 includes a browser application that is capable of handling cookies using web protocols, including cookies that carry a token between the client system 12 and the computer system 10. The client system 12 includes a display for rendering web pages to a user and a user input mechanism, e.g. keyboard, for obtaining inputs from a user. The client system 12 includes a communication mechanism for communicating with the computer system 10 using Internet protocols.

Figure 3:
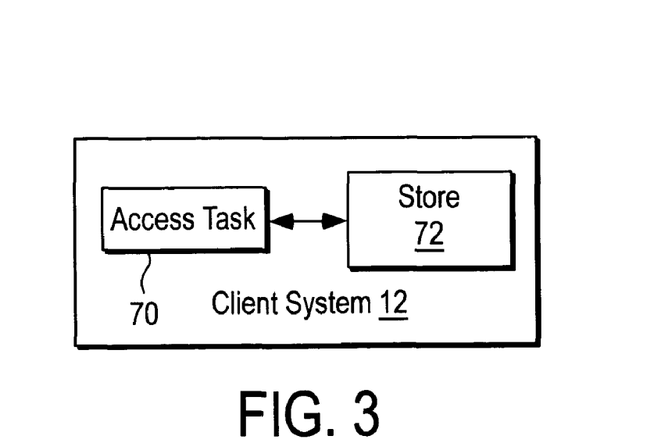
FIG. 3 shows an embodiment of a client system that includes additional mechanisms for handling tokens.

FIG. 3 shows an embodiment of the client system 12 that includes additional mechanisms for handling tokens. In this embodiment, the client system 12 includes an access task 70 that stores and retrieves tokens from a store 72. The access task 70 may be downloaded from the computer system 10 to the client system 12 when the user of the client system 12 creates an account with the computer system 10. The access task 70 once installed and running on the client system 12 enables the computer system 10 to store a token in the store 72 and to retrieve a token from the store 72. For example, the access task 70 may use an HTTP command to communicate the token with the computer system 10. The store 72 may be a file in persistent memory, e.g. on disk, of the client system 12.

Figure 4:
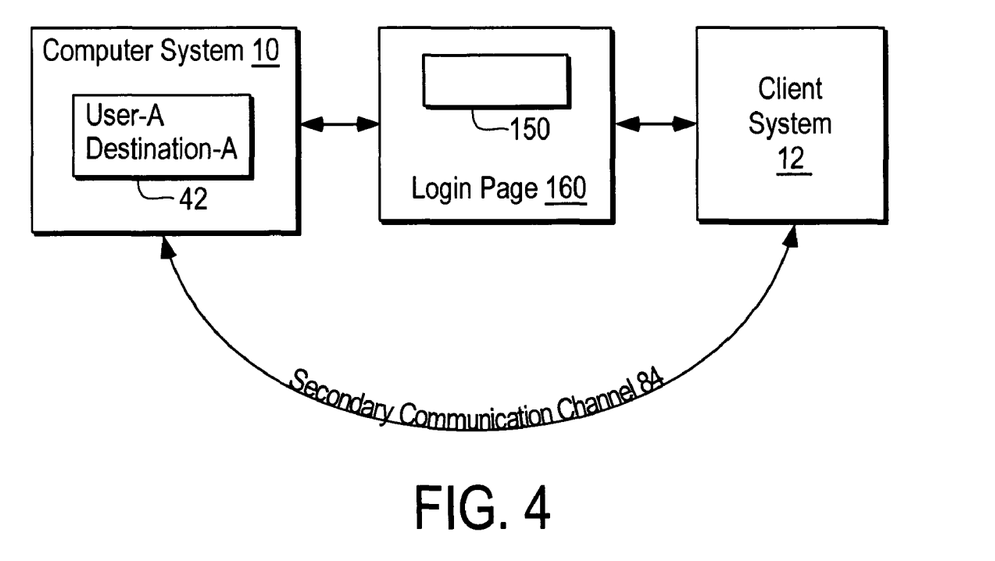
FIG. 4 illustrates a method for authenticating a login by communicating with a user via a secondary communication channel.

FIG. 4 illustrates a method for authenticating a login to the computer system 10 by communicating via a secondary communication channel 84 between the computer system 10 and a user of the client system 12. The computer system 10 generates a login page 160 that enables a user of the client system 12 to enter a username in a login username field 150. The computer system 10 obtains the login username via the login page 160 and uses the login username to locate an entry in the data store 40. For example, if the user entered USER-A into the login username field 150 then the computer system 10 matches the USER-A to the entry 42.

The computer system 10 authenticates the login by performing a communication via the secondary communication channel 84 to a destination DESTINATION-A specified in the entry 42.

In one embodiment, the secondary communication channel 84 is a telephone call to a telephone number specified by the destination DESTINATION-A in the entry 42. The computer system 10 prompts for a validation input via the telephone call. The login is authentic only if the appropriate validation input is provided via the telephone call. For example, the computer system 10 may prompt for entry of a password via the key pad of the telephone 82. The password may be a password originally registered by the user of the client system 12 or some other password. In another example, the computer system 10 may prompt for entry of a yes/no input, voice or via keypad, to a question such as "Is it OK to grant access to your user account at this time?"

In another embodiment, the secondary communication channel 84 is an email message to an email address specified by the destination DESTINATION-A in the entry 42. The email message may prompt the user to enter a validation input via a return email message.

The secondary communication channel 84 may be any communication channel between the computer system 10 and a user of the computer system 12 other than the communication channel used to initiate the login. For example, if the login is initiated via a network using http then the secondary communication channel 84 may be any communication channel other than the http login session.

Figure 5:
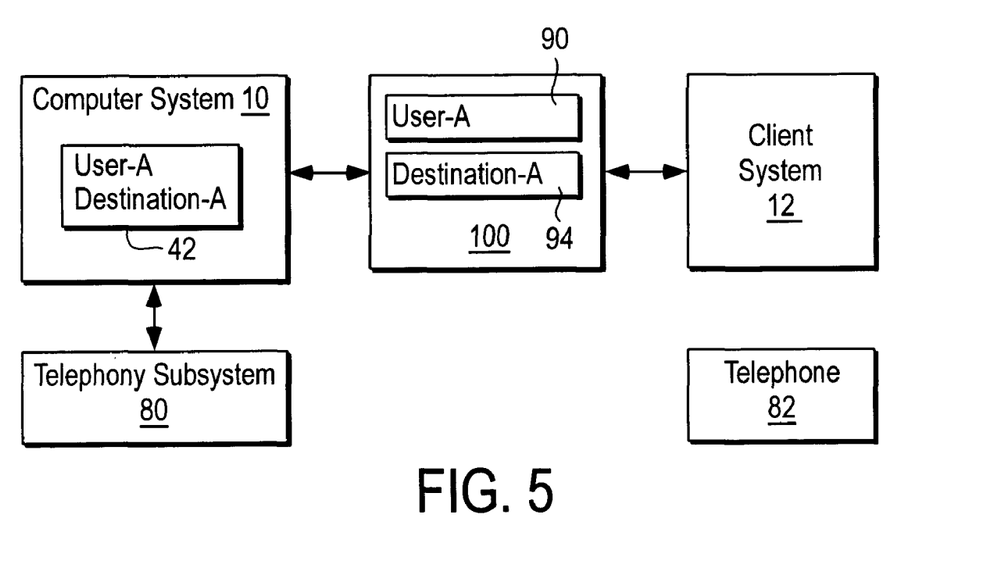
FIG. 5 illustrates creation of a user account in an embodiment that uses a secondary communication channel to authenticate a login.

FIG. 5 illustrates creation of a user account on the computer system 10 in an embodiment that uses a secondary communication channel to authenticate a login. The computer system 10 generates a web page 100 that enables a user of the client system 12 to enter a username USER-A in a username field 90 and a destination DESTINATION-A, e.g. a telephone number, email address, etc., in a destination field 94 for the new user account. In this example, the user of the client system 12 enters a number for their telephone 82. The computer system 10 obtains the username USER-A and the telephone number DESTINATION-A via the web page 100 and stores the username USER-A and the password PASSWORD-A and the telephone number DESTINATION-A in the entry 42 that is allocated to the new user account for later use in authenticating logins. The computer system 10 uses a telephony subsystem 80 to place a telephone call to the telephone 82 in one embodiment.

Figure 6A:
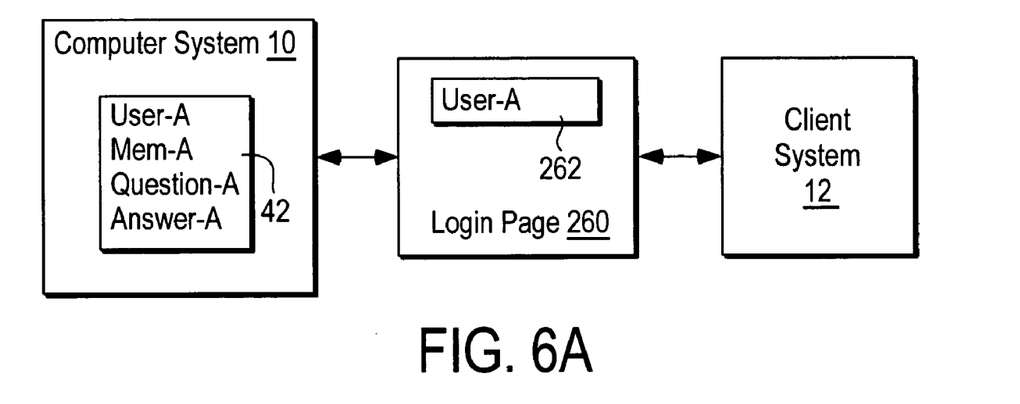
FIGS. 6a-6b illustrate a method for authenticating a login by engaging in a private question/private answer dialogue with a user.
Figure 6B:
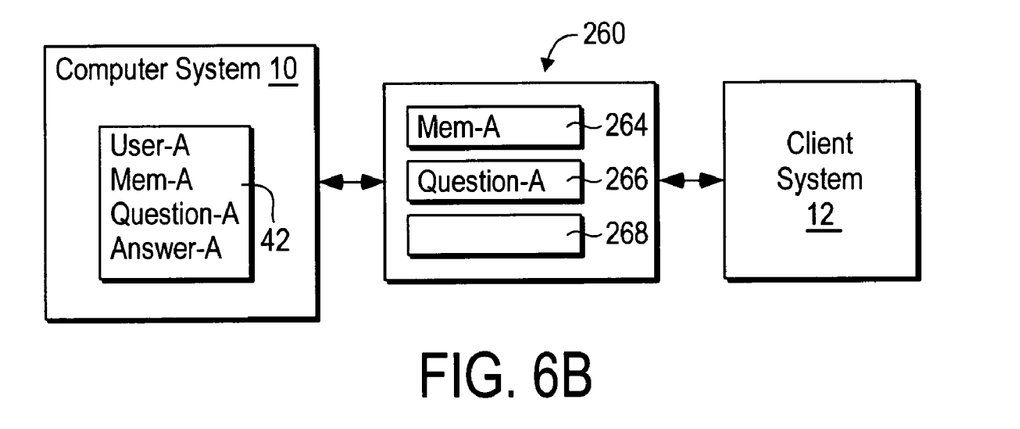

FIGS. 6a-6b illustrate a method for authenticating a login to the computer system 10 by engaging in a private question/private answer dialogue with a user. The computer system 10 generates a login page 260 that enables a user of the client system 12 to enter a username in a login username field 262. The computer system 10 obtains the login username via the login page 260 and uses the login username to locate an entry in the data store 40. For example, if the user entered USER-A into the login username field 262 then the computer system 10 matches the USER-A to the entry 42.

The computer system 10 obtains a private memory MEM-A and a private question QUESTION-A from the entry 42 and presents the private memory MEM-A in a field 264 of the login page 260 and presents the private question QUESTION-A in a field 266 of the login page 260. In response, the user of the client system 12 enters an answer to the private question presented in the field 266 into an input field 268 of the login page 260. The computer system 10 authenticates the login by comparing the answer entered into the input field 268 to the answer ANSWER-A from the entry 42. The login is authentic only if the answer from the input field 268 matches the answer ANSWER-A from the entry 42.

Figure 7:
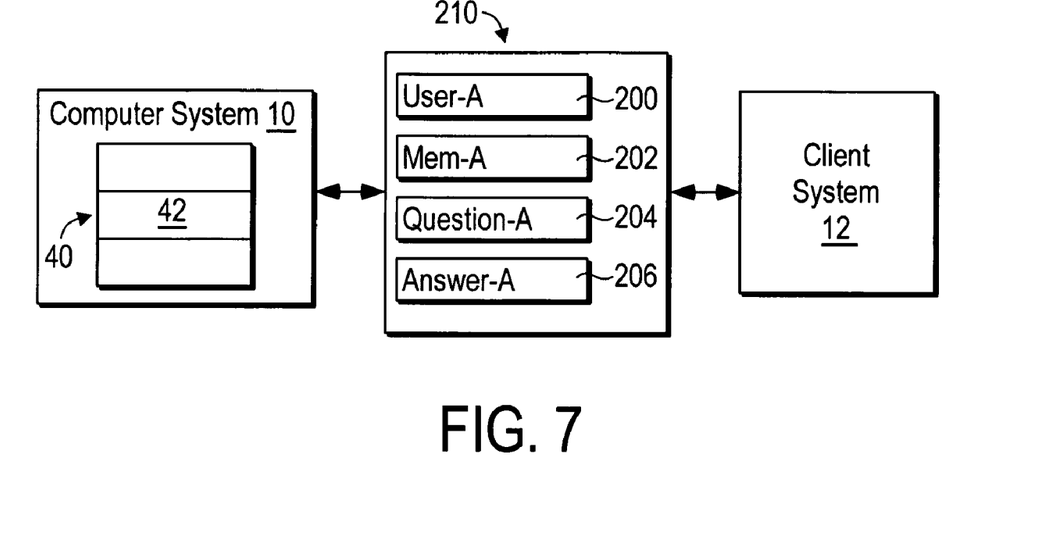
FIG. 7 illustrates creation of a user account in an embodiment that employs a private question/private answer dialogue.

FIG. 7 illustrates creation of a user account on the computer system 10 in an embodiment that employs a private question/private answer dialogue. The computer system 10 generates a web page 210 that enables a user of the client system 12 to enter the username USER-A in a username field 200 and the private memory MEM-A in a private memory field 202 and the private question QUESTION-A in a private question field 204 and the private answer ANSWER-A to the private question QUESTION-A in a private answer field 206 for the new user account.

In one embodiment, the computer system 10 obtains the username USER-A and the private memory MEM-A and the private question QUESTION-A and the private answer ANSWER-A via the web page 210 and stores the information in the entry 42 that is allocated to the new user account. Alternatively, the computer system 10 may store the obtained username USER-A and the private memory MEM-A and the private question QUESTION-A and the private answer ANSWER-A on the client system 12 in a cookie or a file as described above with respect to the token TOKEN-A. The computer system 10 may encrypt the information before storing it.

The private memory MEM-A may be a sentence, e.g. a character string representing a sentence typed by the user of the client system 12, or a digitized audio sample of a sentence spoken by the user of the client system 12, or an audio sample or an image sample, e.g. a picture or other image provided by the user of the client system 12 to name a few examples.

The user of the client system 12 may select the private memory MEM-A so that it is memorable and private to themselves, i.e. not generally known by others. For example, the sentence "My trip to the Italian Alps last summer" would be memorable to a user having visited the Italian Alps last summer and would be private to the user if the trip was not generally known by others.

The user may select the private question QUESTION-A such that it pertains to the private memory MEM-A. For example, the private memory of "My trip to Italy last summer" may correspond to a private question of "Who drove you to the airport for that trip last summer?" A private memory/private question combination according to the present teachings may lessen the memorization burden on a user in comparison to memorizing a password.

The techniques described above for authenticating a login may be combined in any manner. For example, the computer system 10 may authenticate a login by verifying a token on the client system 12 and employing a private memory/private question dialogue with the user of the client system 12.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for authenticating an access to a computer system, comprising:
    initiating an automated telephonic communication channel to a telephone of a user in response to an initiation of a login by the user via an online communication channel to the computer system;
    prompting via the automated telephonic communication channel for the user to recall a security response and provide the security response via the automated telephonic communication channel.

2. The method of claim 1, wherein prompting comprises prompting for the user to recall a password.

3. The method of claim 1, wherein prompting comprises prompting for the user to recall an answer to a question posed via the automated telephonic communication channel.

4. The method of claim 3, wherein the question pertains to a private memory of the user.

5. The method of claim 1, wherein prompting comprises prompting for the user to provide the security response using voice.

6. The method of claim 1, wherein prompting comprises prompting for the user to provide the security response using a keypad of the telephone.

7. A method for authenticating an access to a computer system, comprising:
    initiating an automated telephonic communication channel to a telephone of a user in response to an initiation of a login by the user via an online communication channel to the computer system;
    specifying via the automated telephonic communication channel a response and prompting via the automated telephonic communication channel for the user to provide the response via the automated telephonic communication channel to grant the access.

8. The method of claim 7, wherein prompting comprises prompting for the user to provide the response using voice.

9. The method of claim 7, wherein prompting comprises prompting for the user to provide the response using a keypad of the telephone.

10. A method for authenticating an access to a computer system, comprising:
    obtaining a username via a first communication channel to the computer system;
    initiating an automated telephonic communication channel to a telephone of a user associated with the username wherein the automated telephonic communication channel is different from the first communication channel;
    transmitting an automated prompt via the automated telephonic communication channel that prompts the user to recall a security response and provide the security response back via the automated telephonic communication channel.

11. The method of claim 10, wherein the automated prompt poses a question and prompts the user to recall an answer to the question.

12. The method of claim 11, wherein the question pertains to a private memory of the user.

13. A method for authenticating an access to a computer system, comprising:
    obtaining a username via a first communication channel to the computer system;
    initiating an automated telephonic communication channel to a telephone of a user associated with the username wherein the automated telephonic communication channel is different from the first communication channel;
    transmitting an automated prompt via the automated telephonic communication channel wherein the automated prompt carries a validation input and prompts the user to provide the validation input back via the automated telephonic communication channel to grant the access.

* * * * *

UNITED STATES PATENT AND TRADEMARK OFFICE
CERTIFICATE OF CORRECTION

PATENT NO. : 8,171,303 B2  
APPLICATION NO. : 10/980910  
DATED : May 1, 2012  
INVENTOR(S) : Alexandre Bronstein Page 1 of 1

It is certified that error appears in the above-identified patent and that said Letters Patent is hereby corrected as shown below:

On the Title page, in field [75], "Inventors: Alexandre Bronstein, Palo Alto, CA (US); Alon Waksman, Palo Alto, CA (US)" should be changed to --Inventor: Alexandre Bronstein, Palo Alto, CA (US)--.

Signed and Sealed this  
Second Day of October, 2012

David J. Kappos  
*Director of the United States Patent and Trademark Office*